(12) United States Patent
Fedorovskaya et al.

(10) Patent No.: US 6,983,083 B2
(45) Date of Patent: Jan. 3, 2006

(54) IMAGE SPECIFIC PERCEIVED OVERALL CONTRAST PREDICTION

(75) Inventors: Elena A. Fedorovskaya, Pittsford, NY (US); Michael E. Miller, Rochester, NY (US); Patricia D. Snyder, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 877 days.

(21) Appl. No.: 09/782,240

(22) Filed: Feb. 13, 2001

(65) Prior Publication Data

US 2002/0145757 A1    Oct. 10, 2002

(51) Int. Cl.
*G06K 9/36*    (2006.01)

(52) U.S. Cl. ...................... 382/286; 382/274
(58) Field of Classification Search ............... 382/199, 382/286, 274; 348/353; 345/617
See application file for complete search history.

(56) References Cited

U.S. PATENT DOCUMENTS

| | | | | |
|---|---|---|---|---|
| 3,737,855 A | * | 6/1973 | Cutaia ...................... 382/272 |
| 4,731,671 A | | 3/1988 | Alkofer ..................... 358/284 |
| 4,809,349 A | * | 2/1989 | Herby et al. ............... 382/270 |
| 5,210,799 A | * | 5/1993 | Rao ............................ 382/103 |
| 5,524,070 A | * | 6/1996 | Shin et al. ................. 382/274 |
| 5,642,433 A | | 6/1997 | Lee et al. ................... 382/199 |
| 5,822,453 A | | 10/1998 | Lee et al. ................... 382/169 |
| 6,208,766 B1 | * | 3/2001 | Schweyer et al. ......... 382/274 |
| 6,718,056 B1 | * | 4/2004 | Bothorel et al. ........... 382/132 |

OTHER PUBLICATIONS

Weeks, Jr. "Fundamentals of Electronic Image Processing." SPIE/IEEE (copublishers), 1996, pp. 90-93.*
J. Lubin, "A Visual Discrimination Model for Imaging System Design and Evaluation," Vision Models for Target Detection, World Scientific, Singapore, 1995.
E. Peli, "Contrast of Slightly Complex Patterns: Computing the Perceived Contrast of Gabor Patches," Human Vision and Electronic Imaging, SPIE, 1996, v. 2657, pp. 166-174.
B. Moulden et al., "The Standard Deviation of Luminance as a Metric for Contrast in Random-dot Images", Perception, 1990, v. 19, n. 1, p. 79.

* cited by examiner

Primary Examiner—Vikkram Bali
Assistant Examiner—Colin LaRose
(74) Attorney, Agent, or Firm—Robert Luke Walker

(57) ABSTRACT

A method and structure for determining overall lightness contrast of an image includes extracting pixel values from the image, calculating an image edge contrast based on the pixel values, calculating an area contrast based on the pixel values, calculating image range based on the pixel values, calculating relative average lightness based on the pixel values, and calculating the overall lightness contrast of the image by combining the edge contrast, the image range, the area contrast and the relative average lightness.

34 Claims, 4 Drawing Sheets

IMAGE SPECIFIC PERCEIVED OVERALL CONTRAST PREDICTION

BACKGROUND OF THE INVENTION

1. Field of the Invention

The present invention generally relates to a method and system for estimating perceived overall lightness contrast for a digital image and more particularly to a process and system that combines the following five computed measures: image edge contrast; range of lightness; area contrast; average lightness of an image, relative to the viewing background; average lightness, relative to the pivot point of the tone reproduction curve in computing overall lightness contrast.

2. Description of the Related Art

There are a wide range of conventional models and systems that calculate the contrast of an image. For example, some models, that numerically predict global contrast for complex patterns or natural images were suggested by Lubin (J. Lubin *A Visual Discrimination Model for Imaging System Design and Evaluation*, In: Vision Models for Target Detection, World Scientific, Singapore, 1995), Peli (E. Peli. *Contrast of Slightly Complex Patterns: Computing the Perceived Contrast of Gabor Patches* In: Human Vision and Electronic Imaging, SPIE., 1996, v.2657, 166–174), and Moulden (B. Moulden, et al., *The Standard Deviation of Luminance as a Metric for Contrast in Random-dot Images* Perception, 1990, v. 19, n. 1, p.79), all of which are incorporated herein by reference.

Peli's model and its modification by Lubin require estimation of the local contrast for every pixel within several different frequency bands. A combination rule to produce a local measure of contrast across the bands is based on Pythagorean summation. Although this measure was applied to the case of supra-threshold contrast for a Gabor pattern, it has not been conventionally shown how this can be used to assess overall perceived contrast for a complex natural image.

Moulden disclosed the use of a measure of the standard deviation of luminance to predict contrast for a specific type of images: random-dot images. The standard deviation of luminance produces an imprecise estimation of perceived contrast for black-and white images of natural scenes (coefficient of correlation is less than 0.57 according to a recent evaluation).

U.S. Pat. No. 4,731,671, incorporated herein by reference, describes a method for contrast estimation of an image for the subsequent contrast adjustment in digital image processing. In this method the contrast is automatically determined as a function of the standard deviation of a sample of tone values used to generate the tone reproduction function by normalizing a histogram of the sample of tone values. The standard deviation is used as an estimate of the scene contrast because of the correlation between the standard deviation and the scene contrast. That is, a high standard deviation corresponds to a high scene contrast and a low standard deviation corresponds to a low scene contrast.

The estimated contrast is then compared with a distribution of scene contrasts (i.e., standard deviations from a plurality of scenes) pre-computed from a plurality of random sample of images. If the estimated contrast is higher than the population average, then the image is considered to have a higher than normal contrast and the system reproduction contrast is then adjusted lower so that the printed image will have an image contrast that is closer to the average contrast. If the estimated image contrast is lower than the average, then the system reproduction contrast is raised accordingly.

Although this method works satisfactory for adjusting tone scale in many digital images, it has several shortcomings. Notably, it does not exclude noise and textures, which causes the standard deviation of the selected histogram and, hence, contrast estimation to be biased by large uniform areas or by busy texture areas (such as grass or trees). Secondly, the selected histogram often exhibits bimodality for overcast scenes with sky in them. Despite the scene contrast being low, the standard deviation of the selected histogram is large because of the bimodality caused by the dark grass pixels and the bright sky pixels.

Further, U.S. Pat. No. 5,822,453, incorporated herein by reference, suggested an improved method for estimating contrast of a digital image by using standard deviation of the sampled histogram of the relative log exposure values in an image as a measure of the scene contrast. Sampling of the image histogram ensures that textures and noise in large uniform areas do not affect computation of the scene contrast. The method creates a Laplacian histogram distribution. From the Laplacian histogram it then determines two thresholds, which eliminate substantially uniform areas or a substantially textured portion of the digital image. Based on these thresholds, pixels are selected from the digital image to form a sampled histogram. The standard deviation of the sampled histogram is then computed and used as a measure of the scene contrast. The estimation of contrast of the digital image is performed by comparing the computed standard deviation with a predetermined contrast for determining contrast of the input image in relationship with the predetermined contrast.

Experimental evaluation of this measure shows that it provides higher precision for the assessment of contrast for black-and-white images presented on a screen of the monitor, in comparison to the methods described before (correlation—0.69). However, this method does not address the problem that the scene contrast is affected by the image structure which includes edges, areas of certain lightness values, range of lightness, and other features and is, therefore, a multidimensional percept.

Similarly, U.S. Pat. No. 5,642,433, incorporated herein by reference, discusses a method for single image based image contrast quality evaluation in an automated optical system, particularly in an automated biological screening system. This method emphasizes an importance of edges in an image for detection purposes, especially in images of cytological specimens. It identifies edges in an image using an edge detection technique, and then, computes an image contrast score as the ratio of the accumulated edges of edges intensity to the accumulated edge intensity. This method, however, is best suitable for specific images where detection of particular objects such as biological cells is required. It concentrates on the image edges and does not consider other contrast-related features that are important when a plurality of images of natural scenes are compared with respect to scene contrast.

Consequently, a need exists for an improved method for estimating the scene contrast as perceived by the observer which would serve as a criterion for adjusting the reproduced image contrast.

The invention described below provides higher precision for the assessment of contrast (correlation with the perceived contrast of 0.79–0.92 for different image sets tested). The invention is designed to achieve a reliable prediction for perceived image contrast for a variety of images of natural scenes. Additionally, the invention provides an estimation of a plurality of the contrast-related features which sum up to generate an overall contrast measure. This information can be used to selectively adjust only specific contrast-related features for any single image to satisfy individual preferences or compensate for a lack of contrast generated by other features.

SUMMARY OF THE INVENTION

It is, therefore, an object of the invention to determine overall lightness contrast of an image by extracting pixel values from the image, calculating the image edge contrast based on the pixel values, calculating an area contrast based on the pixel values, calculating the image range based on the pixel values, calculating relative average lightness based on the pixel values, and calculating the overall lightness contrast of the image by combining the edge contrast, the image range, the area contrast and the relative average lightness.

The image edge contrast is calculated in a process which entails determining a local edge contrast and assessing a standard deviation around a mean value for the local edge contrast across an entire image. The area contrast is calculated in a process which entails clustering lightness data into lightness areas by counting the number of lightness areas and determining a mean lightness. The invention computes weighting coefficients for each pair of lightness areas computes the weighted differences in mean lightness for each pair of lightness areas, and determines a sum of the weighted differences to produce the area contrast.

The image range is then calculated in a process which includes choosing a maximum lightness value and a minimum lightness value. The invention adds the maximum lightness value and the minimum lightness value to compute a sum, then subtracts the minimum lightness value from the maximum lightness value to compute a difference, and divides the difference by the sum to produce the image range.

The calculation of the relative average lightness includes calculating a first average lightness relative to an image background and calculating a second average lightness relative to a pivot point of a tone reproduction curve. The invention computes an arithmetic mean of pixel lightness values by computing an absolute value of the difference between a mean lightness of the image and the lightness of the image background to produce the first average lightness. Further, the absolute value of the differences between the mean lightness and the lightness value of the pivot point of the tone reproduction curve produce a second average lightness. Further, the overall contrast can be calculated in a linear or weighted combination of the image edge contrast, the area contrast, the image range, and the relative average lightness.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
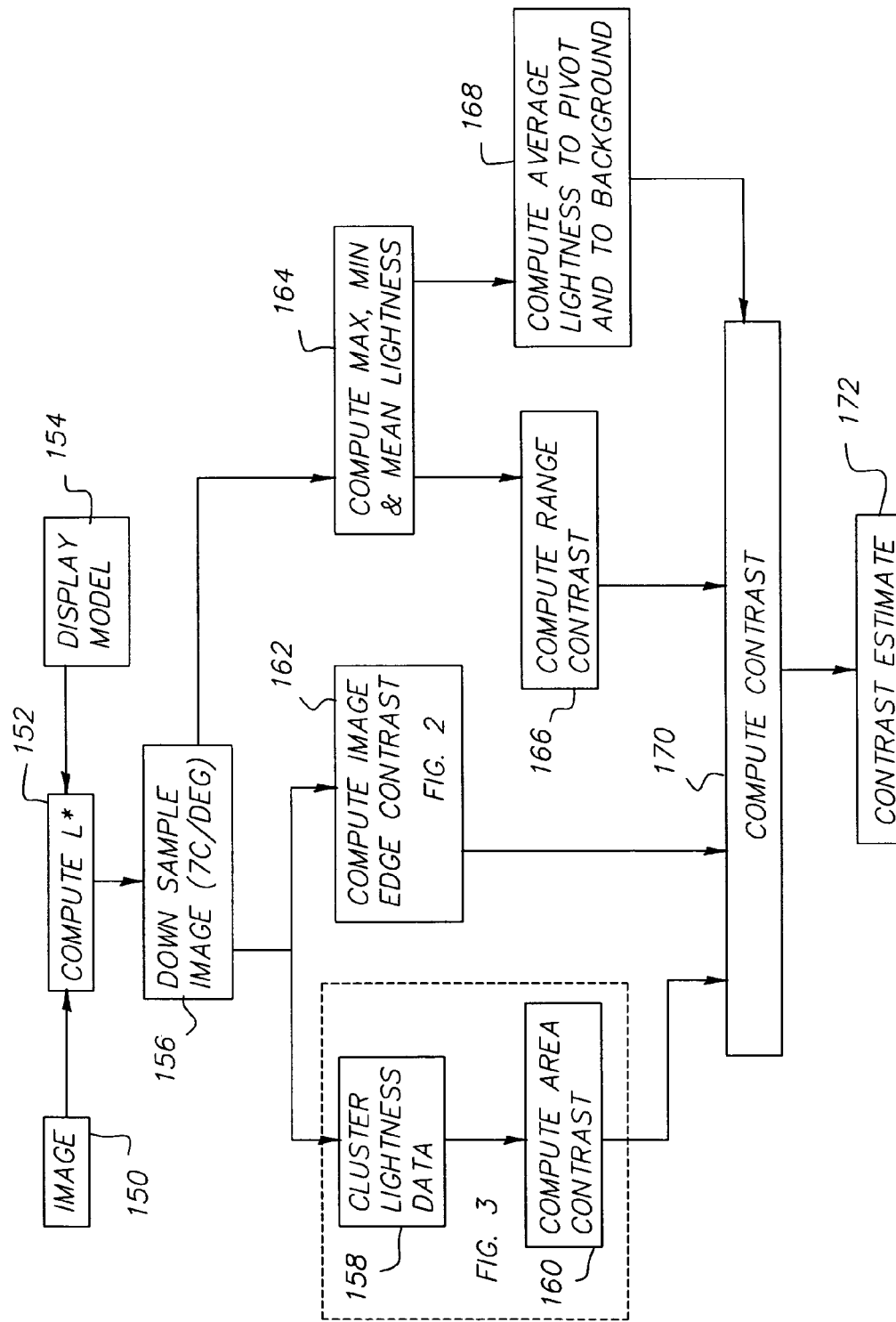
FIG. 1 is a flow diagram illustrating a preferred method of the invention.

The present invention provides a structure and method for estimating perceived overall lightness contrast for a reproduced image and is utilized for a black and white reproduced digital image (e.g., the luminance channel) as well as for a color digital image of a natural scene in terms of the combination of five computed features including: image edge contrast; range contrast; area contrast; average lightness relative to the background lightness; and average lightness relative to the pivot point of the reproduction curve. The invention is image based and allows comparing perceived overall lightness contrast for various images.

Perceived overall lightness contrast is defined here as the integrated impression of lightness variation within an entire image. Perceived overall lightness contrast incorporates the impression of differences in lightness between adjacent as well as remote parts of the image. The definition of lightness as an attribute of visual perception can be found elsewhere (CIE, *International Lighting Vocabulary*, 3rd ed., Paris: CIE Central Bureau, 1970, incorporated herein by reference). Lightness is the attribute of a visual perception according to which the area in which the visual stimulus is presented appears to emit more or less light in proportion to that emitted by a similarly illuminated area perceived as a "white" stimulus.

Thus, perceived overall lightness contrast can be considered as a measure of the perceived tone scale for an image. It has been shown that this image attribute is directly correlated with the perceived quality of a picture. Therefore, optimizing this value results in optimization of the picture quality.

Perceived overall lightness contrast for a black-and-white simulation of an output digital image is estimated by the invention as a linear combination of the following four features: image edge contrast; range contrast; area contrast (lightness diversity); and average lightness relative to the background and a balance point. These features are computed for a representation of an image in a perceptually relevant space or scale, such as, for example, psychometric lightness. The estimation of psychometric lightness is provided by the CIE L*scale.

An optimum feature estimation depends on the noise level and image resolution/pixel size expressed in the cycles per degree of the visual angle. The level of noise can be diminished by applying a noise reduction method. For example, a simple block averaging technique can be used to reduce the noise and at the same time to bring an image to the best resolution for the contrast features estimation.

With the invention, image edge contrast is estimated as follows. The image is first interpolated to acquire a desired pixel size for the image contrast measures (for example, about ∀=8'30" of visual angle). To do this, a viewing distance (l) (inches) and image resolution (r) (pixels/inch) have to be known. Viewing distance can be measured as a distance from the eye of an observer to the center of an image. Scaling constant could then be determined as:

$$k = \frac{1}{2 \times tg(\alpha/2) \times l \times r}, \text{ where } \alpha = 8'30''; \tag{1}$$

and the size of the block for averaging as 1/k.

Then, a measure of a local edge contrast, h, is computed:

$$h(x, y) = \left|\frac{\partial L(x, y)}{\partial x}\right| + \left|\frac{\partial L(x, y)}{\partial y}\right| \tag{2}$$

Where L (here and in all other expressions present in this application) stands for the estimate of lightness, such as, for example, the CIE L*, and x and y (here and in all other expressions present in this application) are the pixel's coordinates. Other estimations, for example, the gradient magnitude, can serve as a measure of the local edge contrast as well. However, the measure h(x,y) was found to provide a better contribution to perceived overall contrast.

For a given pixel at coordinate x and y, the local edge contrast h is determined by adding the absolute values of the differences in lightness between the given pixel and adjacent pixels in horizontal and vertical direction. Thus, the local edge contrast is the difference in lightness between given and adjacent pixels. If there is such a difference (the difference is not equal zero), these pixels constitute an edge. The same method could be applied not to all pixels, but to the true edge pixels, after an edge detection algorithm is performed over a digital image.

The L* values are computed according to the CIE 1976 formula: $L^* = 116(Y/Y_W)^{1/3} - 16$, where Y and $Y_W$ are the Y tristimulus values of a given pixel and the reference white being used. For values of $Y/Y_W$ less than 0.008856, L* is calculated by the formula $L^* = 903.3(Y/Y_W)$. More information on the formulae being used can be found in Hunt *The Reproduction Of Colour*, 5th edition, Fountain Press, England, 1995, incorporated herein by reference. Then, image edge contrast is assessed as the standard deviation around the mean value $\mu_h$ for the local edge contrast across the image.

If mean value is:

$$\mu_h = E\{h(x, y)\} = \frac{1}{\Omega} \int\int_\Omega h(x, y) dx dy \tag{3}$$

where Σ designates an area of the image (this is equal to a number of pixels in an image, or mxp, where m is the number of pixels in a horizontal direction, and p is the number of pixels in a vertical direction), then the standard deviation as the measure of the image edge contrast, Φ, can be found from:

$$\sigma^2(h) = E\{(h(x, y) - \mu_h)^2\}\frac{1}{\Omega}\int\int_\Omega (h(x, y) - \mu_h)^2 dx dy \tag{4}$$

The mean of local edge contrast across pixels, $\mu_h$, in itself can serve as a measure of the image edge contrast. It has been found, however, that the standard deviation provides a better estimate of this feature. In essence, the image edge contrast, Φ, is an overall measure of the differences in lightness between adjacent pixels for the entire image that is expressed using statistical means, such as the standard deviation (or possibly, mean) of these local differences.

As mentioned above, the invention also utilizes the area contrast (or lightness diversity), that is calculated according to the following formula:

$$\text{Area\_contrast} = \sum_{i,j=1n} w_{i,j} |\bar{L}_{Di} - \bar{L}_{Dj}| \tag{5}$$

Where $D_i$, $D_j$ ... $D_n$ are the areas of different lightness, identified within an image, n is the number of those areas; $\bar{L}_{Di}$, $\bar{L}^{Dj}$, ... $\bar{L}_{Dn}$ are the mean lightness values for these areas, and $W_{ij}$ is the weighting coefficient for each pair of lightness areas. The weighting coefficient is computed as:

$$W_{i,j} = 1 - \frac{|m_i - m_j|}{m_i + m_j}, \tag{6}$$

where $m_i$ and $m_j$ represent the number of pixels in the areas $D_i$ and $D_j$, respectively.

The area contrast is calculated by summing up, for all different pairs of the lightness areas, the differences in mean lightness for each pair which is in turn multiplied by the difference between the number one and the ratio of the absolute value of the difference between the numbers of pixels in each lightness area in a given pair to the sum of these numbers of pixels. Area contrast reflects the total impression of differences in perceived lightness between large, more or less, uniform parts of an image.

Area contrast can also be estimated in a slightly modified way compared to the equation (4). Namely, $$\text{Area\_contrast\_modified} = n \cdot \frac{1}{C_n^2} \sum_{i,j=1n} w_{i,j} |\bar{L}_{Di} - \bar{L}_{Dj}| \tag{7}$$

Where $C_n^2$ is the number of different pairs of the lightness areas. Thus, the modified area contrast is calculated as the number of different lightness areas multiplied by the inverse of the number of different pairs of the lightness areas, which in turn is multiplied by the sum of the difference in mean lightness for every pair of the different lightness areas which is in turn multiplied by the difference between the number one and the ratio of the absolute value of the difference between the numbers of pixels in each lightness area in a given pair to the sum of these numbers of pixels. Equation (5) works better in predicting overall perceived contrast, primarily, because of the underestimation of the area contrast by equation (7), when the number of lightness areas is large. Therefore, all the subsequent estimations will be given for the area contrast computed following equation (5).

Different lightness areas can be determined in many ways, using image segmentation, classification or other techniques. In one embodiment, the invention uses a well-known k-means clustering algorithm. The k-means algorithm is based on minimization of the sum of the squared distances from all points in a cluster to a cluster center. The description of this algorithm could be found in any book on cluster analysis (e.g., see Arbie, et al., *Clustering and Classification*, World Scientific Pub. Co., 1996, incorporated herein by reference).

The number of clusters is preferably determined based on the cubic criterion (see Milligan et al., *An Examination of*

Procedures of Determining the Number of Clusters in a Data Set, Psychometrika, 1985, vol. 50, n. 2, 159–179, incorporated herein by reference). The cubic clustering criterion is the test statistic, the maximum value of which is used to indicate the optimal number of clusters in the data. The index is the product of two terms. The first term is the natural logarithm of $(1-E(R^2))/(I-R^2)$ where $R^2$ is the proportion of variance accounted for by the clusters and its expected value is determined under assumption that the data have been sampled from a uniform distribution. The second term is $((np/2)5)/((0.001+E(R^2))1.2)$, where p is an estimate of the dimensionality of the between cluster variation. However, better methods of estimating the optimal number of cluster exist, thus making the procedure more robust.

For color images, instead of area contrast computed over lightness values of an image, color area contrast is the best contributor to the perceived overall contrast. After color image segmentation is performed using, for example, the k-means clustering algorithm described above, and n color areas are identified, color area contrast is computed according to the following equation:

$$\text{Color\_Area\_contrast} = \sum_{i,j=1:n} w_{i,j} \cdot \Delta E_{i,j} \quad (8)$$

Where $\Delta E_{ij}$ is the total color difference between color areas i and j that could be determined in the perceptually uniform color space. This can be done, for example, using CIELAB color difference formula:

$$\Delta E^*_{ab} = [(\Delta L^*)^2 + (\Delta a^*)^2 + (\Delta b^*)^2]^{1/2} \quad (9)$$

Where $\Delta L^*$ is the difference in mean $L^*$ values for two color areas, and $\Delta a^*$ and $\Delta b^*$ are the differences in $a^*$ and in $b^*$ for these areas, respectively. In turn, $a^*$ and $b^*$ can be found as follows:

$$a^* = 500[(X/X_W)^{1/3} - (Y/Y_W)^{1/3}]$$

$$b^* = 200[(Y/Y_W)^{1/3} - (Z/Z_W)^{1/3}] \quad (10)$$

The variables X, Y, and Z and $X_W$, $Y_W$, and $Z_W$ correspond to the X, Y, and Z tristimulus values for any given color and the reference white, respectively. More information on the formulae being used can be found in Hunt, *The Reproduction Of Colour*, 5$^{th}$ edition, Fountain Press, England, 1995.

With respect to image range contrast, the image range contrast is estimated using the formula similar to the well-known Michelson contrast measure. It is compute as follows:

$$\text{Range\_contrast} = \frac{\max\{L(x,y)\} - \min\{L(x,y)\}}{\max\{L(x,y)\} + \min\{L(x,y)\}} \quad (11)$$

Where max $\{L(x,y)\}$ and min $\{L(x,y)\}$ designate the maximum and minimum lightness values for a given image, respectively.

Image range contrast is, thus, the ratio of the lightness range (the difference between maximum and minimum lightness values) to the sum of the extremes.

While image range contrast can be found very effectively using equation (11), as would be known by one ordinarily skilled in the art, other methods are also useful. For example, one could determine the range by simply observing the difference between maximum and minimum lightness values.

Image range contrast represents the measure of the difference between the lightest and the darkest parts of the image and is used to assess the dynamic range of lightness values observed within the entire image.

The average lightness relative to the background lightness is calculated as follows:

$$\text{Average\_lightness\_bckgrd} = \text{abs}(\overline{L} - \text{BackgroundLightness}) \quad (12)$$

Where abs refers to the absolute value which is concerned only with the difference between the greater and the lesser values in a pair of numbers. $\overline{L}$—stands for the mean lightness value, which is calculated according to the following equation:

$$\overline{L} = \frac{1}{\Omega} \int\int_{\Omega} L(x,y) dx dy \quad (13)$$

It is an arithmetical average of the lightness values for all pixels in an image. BackgroundLightness corresponds to the lightness level of the surrounding background expressed in similar units of lightness, that are used for an image itself, for example, L* values, ranging from 0 to 100, and computed similarly to the mean lightness of an image.

The concept of average lightness relative to the background is used here to reflect perceived difference between global impression of lightness produced by the image in comparison with the lightness level of the background. If such a difference exists, then it contributes to the overall perceived contrast impression from an image defined as was mentioned above. Thus, the positive contribution of the average lightness relative to the background is used to determine the perceived overall contrast.

With respect to the average lightness relative to the pivot point of the reproduction curve, it is estimated using on equation similar to equation (12):

$$\text{Average\_lightness\_piv} = \text{abs}(\overline{L} - \text{PivotLightness}) \quad (14)$$

PivotLightness here means a pivot point on the tone reproduction curve if such a curve is applied within an image reproduction system. Originally, the tone reproduction curve was introduced in the process of image reproduction to relate input density values (e.g. of the photographic negative) with the output density values (e.g. of the photographic print) to produce a more pleasing image reproduction that utilizes a limited density range of the output device. The reproduction curve is also used to spread the image densities around a certain value (a pivot point) to avoid substantial, visually noticeable clipping in both, darker and lighter parts of the image. In the current reproduction systems this value is usually chosen to satisfy a large statistical image distribution and may reflect, for example, central moments of the selected image set. However, if a digital image reproduction system is configured differently, where no single reproduction curve is applied, it would yield different results. In this case it can be expected that the feature will not contribute to the perceived overall contrast. Average lightness relative to the pivot point of the reproduction curve is therefore the absolute difference between arithmetical mean of the lightness values of pixels in an image and the lightness value that corresponds to the pivot point of the tone reproduction curve. This measure reflects to what extent an image deviates from the image that would be best reproduced using a given tone reproduction curve without any image-specific tone scale adjustment.

Using image edge contrast; image range contrast; area contrast; average lightness relative to the background; and average lightness relative to the pivot point of the reproduction curve as determined above, the invention determines total overall contrast. In one embodiment, a linear combination of these values is used to assess perceived overall lightness contrast (Pcontrast) for a given image. The relationship between image quality of a black-and-white image and such an integrated impression of the lightness variation implies that the measure can be used to assess the tone scale reproduction and necessity of the tone scale adjustment to produce a higher quality image.

Alternatively, a weighted relationship of image edge contrast; range of lightness; area contrast; average lightness relative to the background and average lightness relative to the pivot point of the reproduction can be used to achieve a specific result. For example, one relationship between the features and subjectively determined perceived overall contrast that has been experimentally found for a set of black-and-white images viewed on the monitor screen, with the background lightness and the pivot point lightness both equal to 50 L* units, is:

$$Pcontrast = A \cdot Edge\_contrast + B \cdot Range\_contrast + C \cdot Area\_contrast + D \cdot AverageLightness\_bckgrd + E \cdot AverageLightness\_piv + F \quad (15)$$

Where A=2.84; B=52.84; C=0.0061; D=0.345; E=0; and F=−3.592. In this case E is set to 0 because both PivotLightness and the BackgroundLightness were identical, and it was not possible to differentiate between the two features' contribution to the perceived contrast. To come up with these coefficients, perceived overall contrast was assessed on a scale from 0 (that corresponded to the lowest possible overall contrast) to 100, (corresponding to the highest possible overall contrast) for a set of black-and-white images, and then, compared with the estimated contrast related features. The mean values for different contrast features across all images that were tested are provided here only for the information purposes. Thus, the mean values for different contrast features computed for the image set used were: Edge_contrast:6.38; Range_contrast: 0.69; L:50.19; Area_contrast:315.13.

For other tested color image sets, these coefficients were within the following ranges: for the Edge_contrast, A=1.9–2.2; for the Range_contrast, B=22.0–26.0; for the Color_area_contrast, C=0.009–0.015; for the Average_Lightness_bckgr, D=0.38–0.68; for the Average_Lightness_pivot, E=(−0.3)–(−0.7).

Another specific set of coefficients was found to work well for a set of hard-copy prints that were viewed in an ordinary office environment against the background of about 27 L*. The pivot point of the tone reproduction curve that was used to print the images was about 40 L*. These coefficients are as follows: for the Edge_contrast, A=1.93; for the Range_contrast, B=24.7; for the Color_area_contrast, C=0.01; for the Average_Lightness bckgr, D=0.67; for the Average_Lightness_pivot, E=(−0.55) and F=1.2.

This invention can be implemented within printing or other reproduction processing to determine whether a scene-dependent tone scale should be applied towards an image. This ideally should save time (not all images have to be put through the scene-dependent tone scale balance algorithms) and prevent quality deterioration for the images that do not require specific tone scale adjustments. The value of different components of the suggested contrast measure may be used to further select between possible tone scales that affect differently mid-tone, highlight and shadow regions. For example, a set of logical rules can be derived based on the magnitudes of the contrast components. Thus, if the edge contrast is low, range is low, and area contrast are high, edge contrast could be improved by the tone scale that increases the value of the reproduction gamma in the mid-tone region and improves the visibility in a highlight region. Low area contrast with other parameters being of average values may mean that presence of a shadow and a highlight should be emphasized. As it was found that different individuals are more sensitive to particular contrast features: image edge contrast, image range, lightness diversity and relative average lightness; selective assessment of these features can be used to determine individually preferred set of images.

Referring now to FIG. 1, a flowchart illustrating the operation of the invention is shown. As shown in item 150, the invention receives the image in digital form. Next, the invention computes of the estimation of lightness L* using the processing discussed above, as shown in item 152, and information about display characteristics which can be a monitor screen or a paper (item 154).

Then, the invention samples pixels down an image in item 156. (The sequence of first, computing pixels' lightness values, and second, sampling down an image, could be reversed without a significant change for the output contrast prediction.) The best pixel size for the contrast related features estimation is about 8'30" of visual angle which corresponds to 3–4 cycles/degree of visual angle.

Next, after sampling down the image in item 156, the invention clusters the lightness data in item 158 and computes the area contrast in item 160, as discussed above. Note that the processing occurring in items 158 and 160 are shown in greater detail in FIG. 3. Simultaneously, the invention computes the image edge contrast in item 162. This processing is also shown in greater detail in FIG. 2.

At the same time, after the invention samples down the image in item 156, it computes the mean lightness 166, as discussed above. In addition, the invention computes the lightness range contrast 168. It also computes the average lightness relative to the background and the average lightness relative to the pivot point in item 170. As also discussed above, the area contrast from item 160, the image edge contrast from item 162, the lightness range contrast from item 168, average lightness relative to the background and the average lightness relative to the pivot point in item 170 are combined in a weighted process in item 172 to compute the contrast and output a contrast estimate (item 174). While the area contrast, the image edge contrast, the mean lightness and the lightness range are all combined to produce perceived overall image contrast in the foregoing example, in certain cases it might be important to combine only a subset of the computed features, if the viewers are not sensitive to or are not interested in specific features' contribution to the overall contrast.

Figure 2:
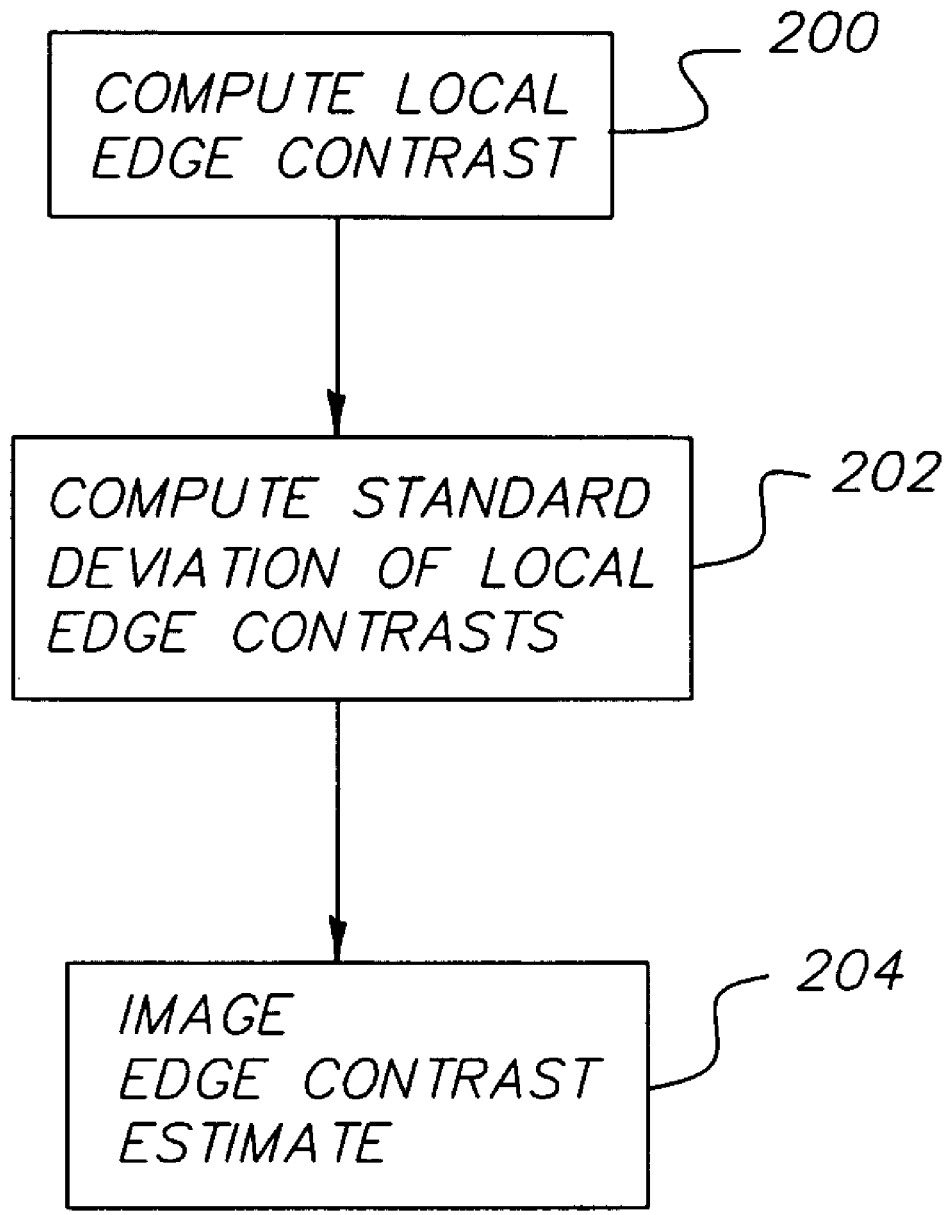
FIG. 2 is a flow diagram illustrating one portion of the invention illustrated in FIG. 1.

Referring now to FIG. 2, the detailed processing that occurs in item 162 in FIG. 1 is shown. More specifically, in item 200, the invention computes the local edge contrast using the processing discussed above. In a similar fashion, the invention computes the standard deviation of the local edge contrast in item 202, which produces the image edge contrast estimate 204.

Figure 3:
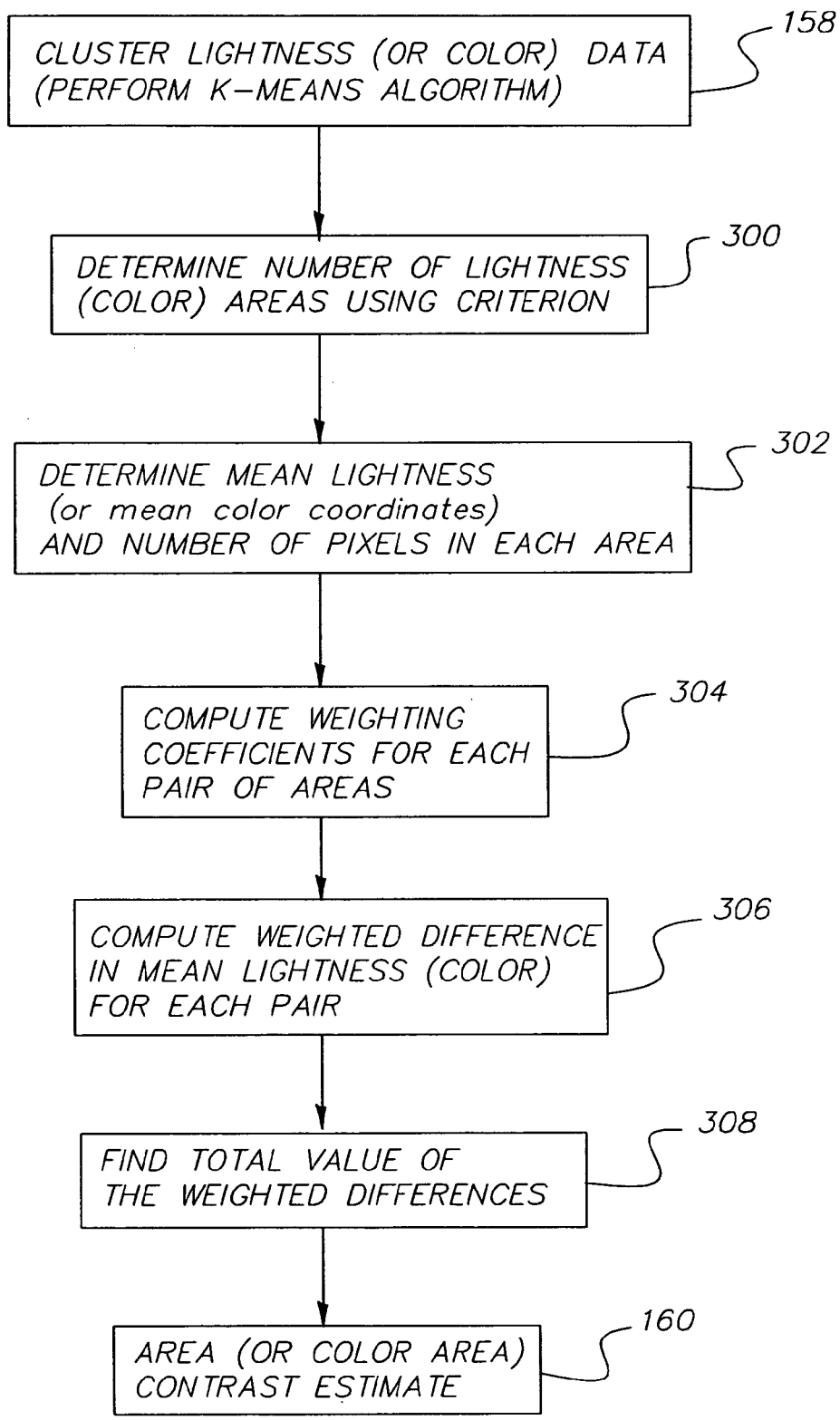
FIG. 3 is a flow diagram illustrating one portion of the invention illustrated in FIG. 1.

As mentioned above, the detailed processing occurring between items 158 and 160 in FIG. 1 is shown in FIG. 3.

More specifically, after the invention clusters lightness or color data in item 158, it determines the number of lightness or color areas using a criterion, for example a 1, discussed above, as shown in item 300. Next, in item 302, the invention determines the mean lightness (and color coordinates) and number of pixels in each area. Subsequently, the invention computes the weighting coefficients for each pair of areas, as illustrated above and as shown in item 304. Next, item 306 illustrates the computation of the weighted differences in mean lightness (and color) for each pair of lightness (or color) areas. Subsequently, the invention finds the sum of the weighted differences in item 308. In item 310, the invention produces the area (or color area) contrast estimate 160, as discussed above.

In describing the present invention, it should be apparent that the present invention is preferably utilized on the digital computer system that produces images, such as a personal computer. It is also instructive to note that the images are either directly input into the computer system (for example by a digital camera) or digitized before input into the computer system (for example by scanning an original, such as a silver halide film).

Figure 4:
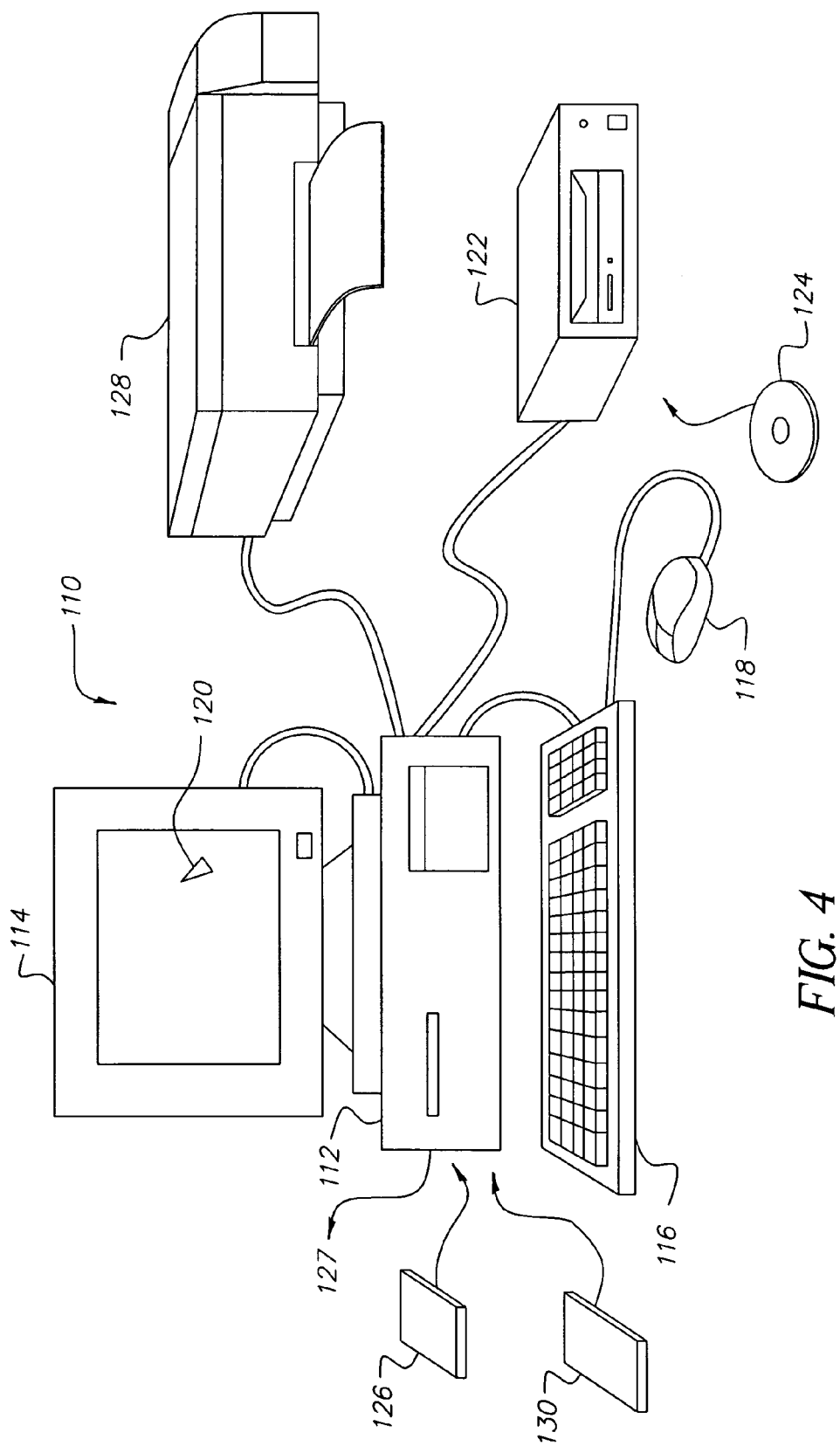
FIG. 4 is a perspective diagram of a computer system for practicing the invention set forth in the preceding figures.

Referring to FIG. 4, there is illustrated a computer system 110 for implementing the present invention. Although the computer system 110 is shown for the purpose of illustrating a preferred embodiment, the present invention is not limited to the computer system 110 shown, but may be used on any electronic processing system that produces images, such as digital printing systems. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In accordance with the invention, this software program could include the contrast prediction application described herein, as well as programs that utilize its output, such as the automatic image compression program. In addition, a floppy disk 126 may also include the software program, and be inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. The program could thus stored on a remote server and accessed therefrom, or downloaded as needed. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown).

The invention can be very well applied in digital printing systems by processing images to predict and adjust contrast. It is suitable also for projecting images on the screen using digital projectors.

While the invention has been described in terms of preferred embodiments, those skilled in the art will recognize that the invention can be practiced with modification within the spirit and scope of the appended claims.

What is claimed is:

1. A method of determining overall lightness contrast of an image comprising:
    extracting pixel values of lightness from said image;
    calculating an image edge contrast based on said pixel values;
    calculating area contrast based on said pixel values;
    calculating image range based on said pixel values;
    calculating relative average lightness based on said pixel values, and
    calculating said overall lightness contrast of said image by combining said edge contrast, said image range, said area contrast and said relative average lightness.

2. The method in claim 1, wherein said image edge contrast is calculated in a process comprising:
    determining a local edge contrast; and
    assessing a standard deviation around a mean value for said local edge contrast across an entire image to produce said image edge contrast.

3. The method in claim 1, wherein said area contrast is calculated in a process comprising:
    clustering lightness data into lightness areas;
    counting a number of said lightness areas;
    determining a mean lightness and a number of pixels in each lightness area;
    computing weighting coefficients for each pair of lightness areas;
    computing weighted differences in mean lightness for each pair of lightness areas; and
    determining a sum of said weighted differences to produce said area contrast.

4. The method in claim 1, wherein said image range is calculated in a process comprising:
    choosing a maximum lightness value and a minimum lightness value;
    adding said maximum lightness value and said minimum lightness value to compute a sum;
    subtracting said minimum lightness value from said maximum lightness value to compute a difference; and
    dividing said difference by said sum to produce said image range.

5. A method of determining overall lightness contrast of an image comprising:
    extracting pixel values from said image;
    calculating an image edge contrast based on said pixel values;
    calculating area contrast based on said pixel values;
    calculating image range based on said pixel values;

calculating relative average lightness based on said pixel values, and calculating said overall lightness contrast of said image by combining said edge contrast, said image range, said area contrast and said relative average lightness;

wherein said calculation of said relative average lightness includes calculating a first average lightness relative to an image background and calculating a second average lightness relative to a pivot point of a tone reproduction curve in a process comprising:

computing an arithmetic mean of pixel lightness values;

computing a first absolute value of a difference between a mean lightness of said image and a lightness of said image background to produce said first average lightness; and computing a second absolute value of a difference between said mean lightness and a lightness value of said pivot point of said tone reproduction curve to produce said second average lightness.

6. A method of determining overall lightness contrast of an image comprising:

extracting pixel values from said image;

calculating an image edge contrast based on said pixel values;

calculating area contrast based on said pixel values;

calculating image range based on said pixel values;

calculating relative average lightness based on said pixel values, and calculating said overall lightness contrast of said image by combining said edge contrast, said image range, said area contrast and said relative average lightness;

wherein said overall contrast is calculated in a linear combination of said image edge contrast, said area contrast, said image range, and said relative average lightness and said overall contrast is calculated in a weighted combination of said image edge contrast, said area contrast, said image range, and said relative average lightness.

7. A method of determining overall lightness contrast of an image comprising:

A) extracting pixel values from said image;

B) performing at least one of the following processes;
1) calculating an image edge contrast based on said pixel values;
2) calculating area contrast based on said pixel values; and
3) calculating image range based on said pixel values;

C) calculating relative average lightness based on said pixel values, wherein said calculating of said relative average lightness includes calculating at least one of a first average lightness relative to an image background and a second average lightness relative to a pivot point of a tone reproduction curve; and D) calculating said overall lightness contrast of said image by combining said relative average lightness and at least one of the following: said edge contrast, said image range, and said area contrast.

8. The method in claim 7, wherein said image edge contrast is calculated in a process comprising:

determining a local edge contrast; and assessing a standard deviation around a mean value for said local edge contrast across an entire image to produce said image edge contrast.

9. The method in claim 7, wherein said area contrast is calculated in a process comprising:

clustering lightness data into lightness areas;

counting a number of said lightness areas;

determining a mean lightness and a number of pixels in each lightness area;

computing weighting coefficients for each pair of lightness areas; computing weighted differences in mean lightness for each pair of lightness areas; and determining a sum of said weighted differences to produce said area contrast.

10. The method in claim 7, wherein said image range is calculated in a process comprising:

choosing a maximum lightness value and a minimum lightness value; adding said maximum lightness value and said minimum lightness value to compute a sum;

subtracting said minimum lightness value from said maximum lightness value to compute a difference; and dividing said difference by said sum to produce said image range.

11. A method of determining overall lightness contrast of an image comprising:

A) extracting pixel values from said image;

B) performing at least one of the following processes:
1) calculating an image edge contrast based on said pixel values;
2) calculating area contrast based on said pixel values; and
3) calculating image range based on said pixel values;

C) calculating relative average lightness based on said pixel values; and

D) calculating said overall lightness contrast of said image by combining at least two of the following: said edge contrast, said image range, said area contrast and said relative average lightness;

wherein said calculating of said relative average lightness includes calculating a first average lightness relative to an image background and calculating a second average lightness relative to a pivot point of a tone reproduction curve in a process comprising:

computing an arithmetic mean of pixel lightness values;

computing an first absolute value of a difference between a mean lightness of said image and a lightness of said image background to produce said first average lightness; and computing a second absolute value of a difference between said mean lightness and a lightness value of said pivot point of said tone reproduction curve to produce said second average lightness.

12. The method in claim 7, wherein said overall contrast is calculated in a linear combination of at least two of said image edge contrast, said area contrast, said image range, and said relative average lightness.

13. The method in claim 7, wherein said overall contrast is calculated in a weighted combination of at least two of said image edge contrast, said area contrast, said image range, and said relative average lightness.

14. A method of determining overall lightness contrast of an image comprising:

extracting pixel values of lightness from said image;

calculating an image edge contrast based on said pixel values;

calculating color area contrast based on said pixel values;

calculating image range based on said pixel values;

calculating relative average lightness based on said pixel values; and calculating said overall lightness contrast of said image by combining said edge contrast, said image range, said color area contrast and said relative average lightness.

15. The method in claim 14, wherein said image edge contrast is calculated in a process comprising:
  determining a local edge contrast; and
  assessing a standard deviation around a mean value for said local edge contrast across an entire image to produce said image edge contrast.

16. The method in claim 14, wherein said color area contrast is calculated in a process comprising:
  clustering color data into color areas;
  counting a number of said color areas;
  determining color values and a number of pixels in each color area; computing weighting coefficients for each pair of color areas;
  computing weighted differences in mean color for each pair of color areas; and
  determining a sum of said weighted differences to produce said color area contrast.

17. The method in claim 14, wherein said image range is calculated in a process comprising:
  choosing a maximum lightness value and a minimum lightness value; adding said maximum lightness value and said minimum lightness value to compute a sum;
  subtracting said minimum lightness value from said maximum lightness value to compute a difference; and
  dividing said difference by said sum to produce said image range.

18. A method of determining overall lightness contrast of an image comprising:
  extracting pixel values from said image;
  calculating an image edge contrast based on said pixel values; calculating color area contrast based on said pixel values; calculating image range based on said pixel values;
  calculating relative average lightness based on said pixel values, and calculating said overall lightness contrast of said image by combining said edge contrast, said image range, said color area contrast and said relative average lightness;
  wherein said average lightness includes calculating a first average lightness relative to an image background and calculating a second average lightness relative to a pivot point of a tone reproduction curve in a process comprising:
    computing an arithmetic mean of pixel lightness values;
    computing a first absolute value of a difference between a mean lightness of said image and a lightness of said image background to produce said first average lightness; and
    computing a second absolute value of a difference between said mean lightness and a lightness value of said pivot point of said tone reproduction curve to produce said second average lightness.

19. The method in claim 14, wherein said overall contrast is calculated in a linear combination of said image edge contrast, said color area contrast, said image range, and said relative average lightness.

20. The method in claim 19, wherein said overall contrast is calculated in a weighted combination of said image edge contrast, said color area contrast, said image range, and said relative average lightness.

21. A computer program product for determining overall lightness contrast of an image, said computer program product comprising: a computer readable storage medium having a computer program stored thereon for performing a method comprising:
  extracting pixel values of lightness from said image;
  calculating an image edge contrast based on said pixel values;
  calculating area contrast based on said pixel values;
  calculating image range contrast based on said pixel values;
  calculating relative average lightness based on said pixel values, and
  calculating said overall lightness contrast of said image by combining said edge contrast, said image range, said area contrast and said relative average lightness.

22. The computer program product in claim 21, wherein said image edge contrast is calculated in a process comprising:
  determining a local edge contrast; and
  assessing a standard deviation around a mean value for said local edge contrast across an entire image to produce said image edge contrast.

23. The computer program product in claim 21, wherein said area contrast is calculated in a process comprising:
  clustering lightness data into lightness areas; counting a number of said lightness areas;
  determining a mean lightness and a number of pixels in each lightness area;
  computing weighting coefficients for each pair of lightness areas;
  computing weighted differences in mean lightness for each pair of lightness areas; and
  determining a sum of said weighted differences to produce said area contrast.

24. The computer program product in claim 21, wherein said image range is calculated in a process comprising:
  choosing a maximum lightness value and a minimum lightness value;
  adding said maximum lightness value and said minimum lightness value to compute a sum;
  subtracting said minimum lightness value from said maximum lightness value to compute a difference; and
  dividing said difference by said sum to produce said image range.

25. A computer program product for determining overall lightness contrast of an image, said computer program product comprising: a computer readable storage medium having a computer program stored thereon for performing a method comprising:
  extracting pixel values from said image;
  calculating an image edge contrast based on said pixel values;
  calculating area contrast based on said pixel values;
  calculating image range based on said pixel values;
  calculating relative average lightness based on said pixel values, and
  calculating said overall lightness contrast of said image by combining said edge contrast, said image range, said area contrast and said relative average lightness;
  wherein said calculation of said relative average lightness includes calculating a first average lightness relative to an image background and calculating a second average lightness relative to a pivot point of a tone reproduction curve in a process comprising:
    computing an arithmetic mean of pixel lightness values;
    computing a first absolute value of a difference between a mean lightness of said image and a lightness of said image background to produce said first average lightness; and
    computing a second absolute value of a difference between said mean lightness and a lightness value of said pivot point of said tone reproduction curve to produce said second average lightness.

26. The computer program product in claim 21, wherein said overall contrast is calculated in a linear combination of said image edge contrast, said area contrast, said image range, and said relative average lightness.

27. The computer program product in claim 26, wherein said overall contrast is calculated in a weighted combination of said image edge contrast, said area contrast, said image range, and said relative average lightness.

28. A method of determining overall lightness contrast of an image comprising:
extracting pixel values of lightness from said image;
calculating an image edge contrast based on said pixel values;
calculating area contrast based on said pixel values;
calculating image range based on said pixel values;
calculating relative average lightness based on said pixel values, and
calculating said overall lightness contrast of said image by combining said edge contrast, said image range, said area contrast, and said relative average lightness;
wherein said image edge contrast is calculated in a process comprising:
detecting edges in said image based on said pixel values;
determining local edge contrast at said edges; and
assessing a standard deviation around a mean value for said local edge contrast of said edges to produce said image edge contrast.

29. A method of determining overall lightness contrast of an image having a plurality of pixels, said method comprising:
detecting edges in said image based on values of said pixels;
calculating an image edge contrast based on said edges;
calculating area contrast of said image based on values of said pixels;
calculating image range contrast based on values of said pixels;
calculating relative average lightness of said image based on values of said pixels, and
calculating said overall lightness contrast of said image, said overall lightness contrast being a linear combination of said edge contrast, said area contrast, said image range contrast, and said relative average lightness.

30. The method of claim 29, wherein said image edge contrast is calculated in a process comprising:
determining local edge contrast at said edges; and
assessing a standard deviation around a mean value for said local edge contrast of said edges to produce said image edge contrast.

31. The method of claim 29, wherein said calculating said area contrast further comprises determining a mean lightness.

32. The method of claim 29, wherein said calculating of said image range contrast includes determining a maximum lightness value and a minimum lightness value.

33. The method of claim 29, wherein said calculating of said relative average lightness includes calculating at least one of a first average lightness relative to an image background and a second average lightness relative to a pivot point of a tone reproduction curve.

34. A method of determining overall lightness contrast of an image, said method comprising:
calculating edge contrast of said image;
calculating area contrast of said image;
calculating image range contrast of said image;
calculating relative average lightness of said image, and
calculating said overall lightness contrast of said image, said overall lightness contrast being a linear combination of said edge contrast, said area contrast, said image range contrast, and said relative average lightness.

* * * * *